United States Patent
Adams et al.

(10) Patent No.: US 10,323,932 B1
(45) Date of Patent: Jun. 18, 2019

(54) SYSTEM FOR INSPECTING VEHICLE BODIES

(71) Applicant: FORD MOTOR COMPANY, Dearborn, MI (US)

(72) Inventors: Scott Adams, Milan, MI (US); Marina Menendez Baker, Madison Heights, MI (US); Mark Edward Nichols, Saline, MI (US); Tony Misovski, Oxford, MI (US)

(73) Assignee: Ford Motor Company, Dearborn, MI (US)

( * ) Notice: Subject to any disclaimer, the term of this patent is extended or adjusted under 35 U.S.C. 154(b) by 48 days.

(21) Appl. No.: 15/856,981

(22) Filed: Dec. 28, 2017

(51) Int. Cl.
*G01B 11/06* (2006.01)
*G01B 11/00* (2006.01)
*B65G 49/00* (2006.01)

(52) U.S. Cl.
CPC .......... *G01B 11/0633* (2013.01); *B65G 49/00* (2013.01); *G01B 11/002* (2013.01); *B65G 2201/0294* (2013.01)

(58) Field of Classification Search
CPC ...................... G01B 11/0691; G01B 11/0633; G01B 11/10; G01B 11/002; G01B 11/005;
(Continued)

(56) References Cited

U.S. PATENT DOCUMENTS 5,240,745 A 8/1993 Yamamoto et al.
6,528,109 B1 * 3/2003 Filev ...................... B05B 12/12
118/313

(Continued)

FOREIGN PATENT DOCUMENTS

EP 0943372 A2 9/1999
EP 2213977 A1 8/2010

OTHER PUBLICATIONS

Yasui et al., "Terahertz paintmeter for noncontact monitoring of thickness and drying progress in paint film", Applied Optics, Applications-Centered Research in Optics, vol. 44, Issue 32, pp. 6849-6856 (2005), http://dx.doi.org/10.1364/AO.44.006849, 2 pgs.

(Continued)

*Primary Examiner* — Jamil Ahmed
(74) *Attorney, Agent, or Firm* — Raymond L. Coppiellie; Brooks Kushman P.C.

(57) ABSTRACT

An inspection station includes a conveyor, a first scanner, a second scanner, a controller, and an interface. The conveyor is configured to continuously transport a vehicle body through the station. The first scanner is configured to detect features of the vehicle body and associated feature coordinates relative to a global coordinate system. The second scanner is configured to detect paint thicknesses on surfaces of the vehicle body and associated paint thickness coordinates relative to the global coordinate system. The controller is programmed to map corresponding pairs of the feature coordinates and paint thickness coordinates into a single set of local coordinates having a datum defined by the vehicle body such that each of the local coordinates defines a location of one of the features relative to the datum and one of the paint thicknesses at the location. The interface is configured to display the features and corresponding paint thicknesses.

20 Claims, 4 Drawing Sheets

(58) Field of Classification Search
CPC ......... G01B 11/02; G01B 11/08; G01B 11/04; G01B 11/0616; B65G 49/025; B65G 2201/0294
See application file for complete search history.

(56) References Cited

U.S. PATENT DOCUMENTS

| | | | |
|---|---|---|---|
| 7,145,148 | B2 | 12/2006 | Alfano et al. |
| 7,214,940 | B2 | 5/2007 | Cluff et al. |
| 7,342,665 | B2 | 3/2008 | Drake, Jr. |
| 7,876,423 | B1 | 1/2011 | Roth |
| 8,050,531 | B2 | 11/2011 | Rahman et al. |
| 8,399,838 | B2 | 3/2013 | Evans et al. |
| 8,619,832 | B2 | 12/2013 | Hu et al. |
| 2002/0114883 | A1 | 8/2002 | Mushett et al. |
| 2003/0089563 | A1 | 5/2003 | Takakusagi et al. |
| 2005/0106328 | A1 | 5/2005 | Moore et al. |
| 2006/0011812 | A1 | 1/2006 | Wolleschensky et al. |
| 2007/0114419 | A1 | 5/2007 | Bastiaans et al. |
| 2007/0138392 | A1 | 6/2007 | Cole |
| 2009/0066344 | A1 | 3/2009 | Bray et al. |
| 2010/0195090 | A1 | 8/2010 | Ohtake |
| 2011/0028824 | A1 | 2/2011 | Cole et al. |
| 2012/0076923 | A1 | 3/2012 | Bucher |
| 2013/0204577 | A1 | 8/2013 | Savard et al. |
| 2013/0309302 | A1 | 11/2013 | Funke et al. |
| 2015/0212060 | A1 | 7/2015 | Van Mechelen et al. |
| 2017/0050208 | A1 | 2/2017 | Nichols et al. |

OTHER PUBLICATIONS http://www.photonics.com/Article.aspx?AID=56233, "THz Technique Determines Paint Thickness", Research & Technology, May 2014, 2 pgs; date accessed: Dec. 30, 2014.

Rosenberg et al., "Online/Robotic Integrated Thickness and Color Measurement", paintandpowder.com, Finishing Today, Jan. 2006, 3 pgs.

Chen et al., "Automated Industrial Robot Path Planning for Spray Painting Process: A Review", 4th IEEE Conference on Automation Science and Engineering, Key Bridge Marriott, Washington D.C., USA, Aug. 23-26, 2008, pp. 522-527.

"Transform World-Space Coordinates to Local Rigid Body Coordinates", NaturalPoint Help Center, Portal, Knowledgebase, OptiTrack by NaturalPoint, Nov. 8, 2017, 1 page.

Yasuda et al., "Real-time two-dimensional terahertz tomography of moving objects", Elsevier, ScienceDirect, Optics Communications 267 (2006) pp. 128-136, www.sciencedirect.com.

Yasui et al., "Noncontact Terahertz Paintmeter for Real-Time Two-Dimensional Cross-Section Imaging of Paint Film Thickness", ECNDT 2006—Tu.2.8.2, 4 pages.

Yasuda et al., "Improvement of minimum paint film thickness for THz paint meters by multiple-regression analysis", Optical Society of America, Applied Optics, vol. 46, No. 30, Oct. 20, 2007, pp. 7518-7526.

\* cited by examiner

FIG. 5 understand# SYSTEM FOR INSPECTING VEHICLE BODIES

TECHNICAL FIELD

The present disclosure relates to systems for inspecting vehicle bodies.

BACKGROUND

During the processes of manufacturing and assembling vehicles, various inspection steps may be implemented to ensure specific physical characteristics are within design tolerances.

SUMMARY

An inspection station includes a conveyor, a first scanner, a second scanner, a controller, and an interface. The conveyor is configured to continuously transport a vehicle body through the station. The first scanner is configured to detect features of the vehicle body and associated feature coordinates relative to a global coordinate system. The second scanner is configured to detect paint thicknesses on surfaces of the vehicle body and associated paint thickness coordinates relative to the global coordinate system. The controller is programmed to map corresponding pairs of the feature coordinates and paint thickness coordinates into a single set of local coordinates having a datum defined by the vehicle body such that each of the local coordinates defines a location of one of the features relative to the datum and one of the paint thicknesses at the location. The interface is configured to display the features and corresponding paint thicknesses.

A method includes detecting features of a vehicle body relative to global coordinates, detecting paint thicknesses of the vehicle body relative to the global coordinates, mapping corresponding global coordinates of the features and paint thicknesses into a set of local coordinates having an origin defined by the vehicle body (the local coordinates corresponding to locations of the features and associated paint thicknesses at each location) and displaying the features and corresponding paint thicknesses.

A method includes mapping global coordinates of features of a vehicle body and global coordinates of corresponding paint thicknesses detected while the vehicle body is transported through an inspection station into local coordinates having an origin defined by the vehicle body (the local coordinates corresponding to locations of the features and associated paint thicknesses at each location) and displaying the features and corresponding paint thicknesses.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
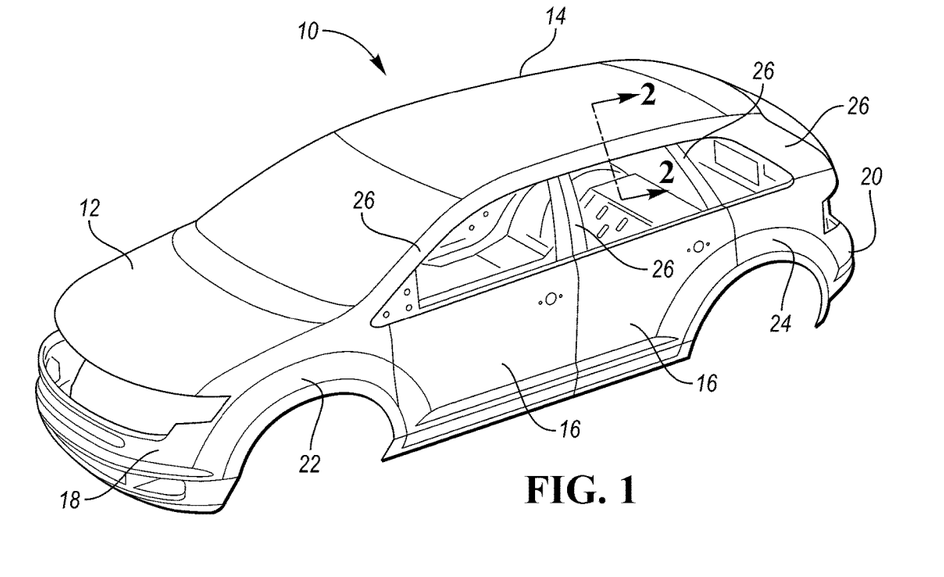
FIG. 1 is a schematic illustration of a representative vehicle body.

Referring to FIG. 1, a representative vehicle body 10 is illustrated. The specific components of the vehicle body 10 illustrated in FIG. 1 include a hood 12, a roof panel 14, door panels 16, a front bumper 18, a rear bumper 20, a front fender 22, a rear fender 24, and various pillars 26. It should be understood, however, that the components of the vehicle body 10 in FIG. 1 should not be construed as limited to the specific components depicted in FIG. 1. For Example, the vehicle body 10 may more specifically include roof rails, pillars (such as A-pillars, B-pillars, C-pillars, D-pillar, etc.), side rails, front rails, rear rails, rocker panels, strut or shock towers, roof cross members, floor cross members, floor panels, roof panels, firewalls, radiator core supports, powertrain component supports (e.g., engine or transmission supports), or any other component of a vehicle body structure or the frame known in the art. Furthermore, although the vehicle body 10 is depicted as a sport-utility vehicle (SUV), it should be understood that the vehicle body 10 may be representative of any type of vehicle including, but not limited to, compact cars, sedans, SUVs, trucks, etc.

Figure 2:
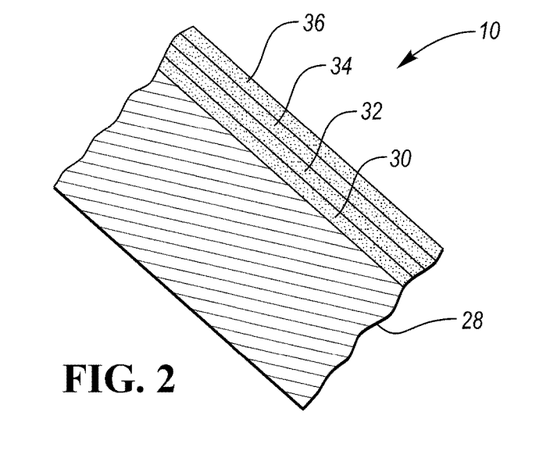
FIG. 2 is a cross-sectional view taken along line 2-2 in FIG. 1.

Referring to FIG. 2, a cross-sectional view taken along line 2-2 in FIG. 1 is illustrated. More specifically, the cross-sectional view is a partial cross-section of the roof panel 14. However, it should be understood that the cross-section depicted in FIG. 2 maybe representative of a cross-section of any of the specific components of the vehicle body 10. Therefore, the cross-sectional view of FIG. 2 will generically be referred to as a cross-sectional view of the vehicle body 10. The vehicle body 10 may include a structural layer 28 that is comprised of a structural material such as steel, aluminum, magnesium, carbon-fiber composite, etc. One or more paint layers may be deposited in subsequent layers on an exterior surface of vehicle body 10. The paint layers may include an electro coat layer 30, a primer layer 32, a basecoat layer 34, and a clearcoat layer 36.

Figure 3:
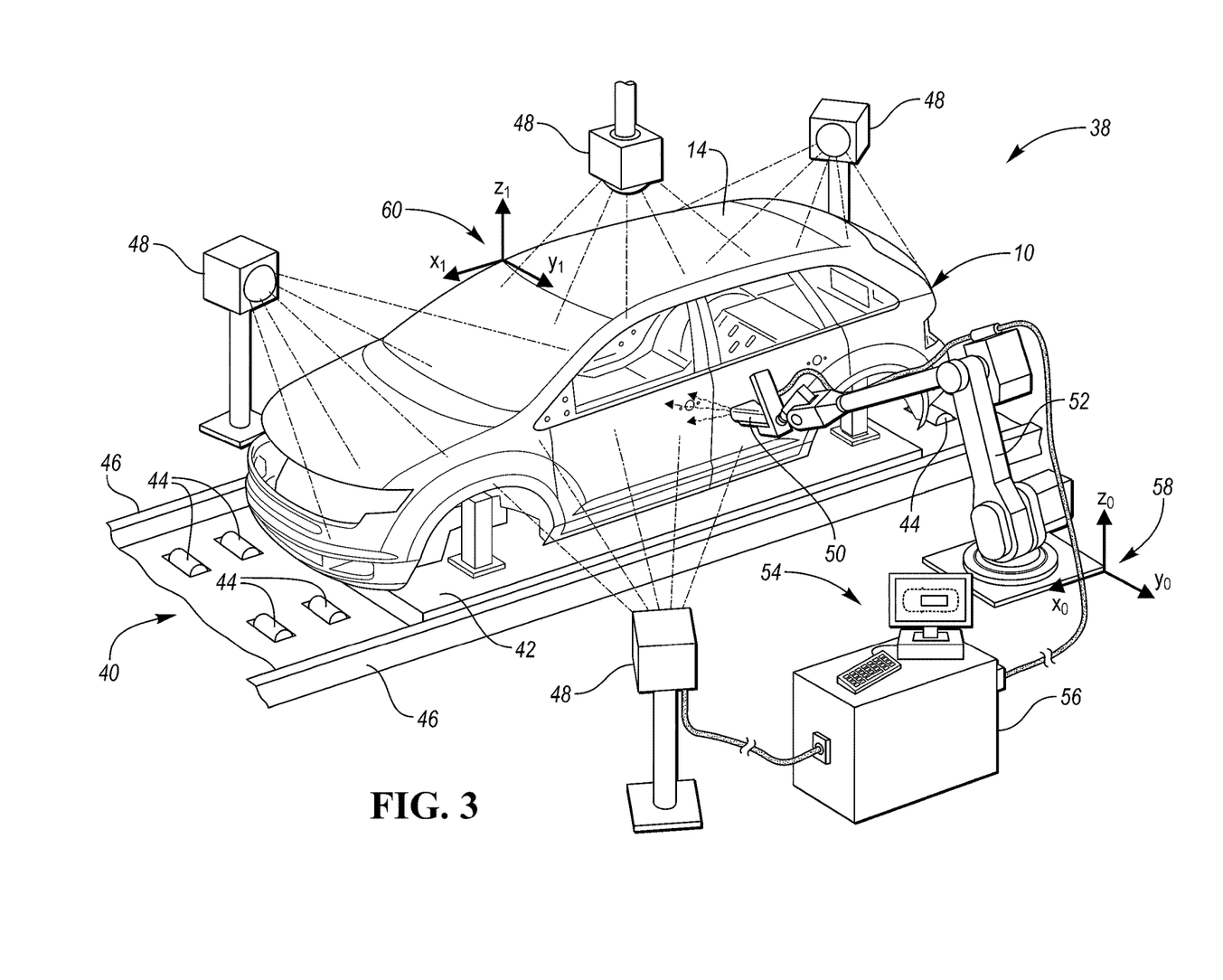
FIG. 3 is a partial perspective view of a vehicle body inspection station.

Referring to FIG. 3, a perspective view of a vehicle body inspection station 38 is illustrated. The inspection station 38 includes a conveyor or conveyance system 40 that is configured to transport the vehicle body 10 through the inspection station 38. Pallets or fixtures 42 are configured to position vehicle bodies 10 while being transported through the inspection station 38. The conveyance system 40 may include powered rollers 44 and rails 46 that respectively propel and guide the fixtures 42 and vehicle bodies 10 through the inspection station 38. The conveyance system 40 may be configured to continuously transport the fixtures 42 and vehicle bodies 10 through the inspection station 38 at a substantially constant speed without stopping in the inspection station 38. A substantially constant speed may refer to a desired constant speed of the fixtures 42 and vehicle bodies 10 while being transported through the inspection station 38, including any minor fluctuations in speed. For example, if the desired constant speed to transport the fixtures 42 and vehicle bodies 10 through the inspection station 38 is six inches per second, a speed value that fluctuates between five and seven inches per second may be considered a substantially constant speed.

The inspection station 38 may include a first electromagnetic scanner 48 (or a first set of electromagnetic scanners) and a second electromagnetic scanner 50 (or a second set of electromagnetic scanners). The first electromagnetic scanner 48 is configured to detect features of the vehicle body 10 (e.g., specific components illustrated in FIG. 1, such as the door panels 16) and associated coordinates of the features of the vehicle body 10 relative to a global coordinate system while the vehicle body 10 is being transported through the inspection station 38. The first electromagnetic scanner 48 may include emitting electromagnetic waves and detecting reflections of the electromagnetic waves from the features of the vehicle body 10 in order to determine positions of the features of the vehicle body 10 and associated global coordinates. For example, the first electromagnetic scanner 48 may be a laser scanner such as a Light Imaging, Detection, And Ranging (LIDAR) scanner.

The second electromagnetic scanner 50 may be configured to detect the thicknesses of the paint layers (e.g., electro coat layer 30, primer layer 32, basecoat layer 34, and clearcoat layer 36) that are deposited in subsequent layers on the exterior surface of vehicle body 10 and associated coordinates of the paint thickness relative to the global coordinate system while the vehicle body 10 is being transported through the inspection station 38. The second electromagnetic scanner 50 may include emitting electromagnetic waves that interact with exterior surfaces of the vehicle body 10. At least one of the paint layers may be transparent to the electromagnetic waves generated by the second electromagnetic scanner 50. The second electromagnetic scanner 50 may then be configured to detect reflections or refractions from the boundaries between paint layers. Based on the reflections or refractions and the refractive index of the individual paint layers, the second electromagnetic scanner 50 may determine the thickness of the individual paint layers. More specifically, the second electromagnetic scanner 50 may be a terahertz radiation scanner. An example of utilizing a terahertz radiation scanner to determine the thickness of layers of material that are transparent electromagnetic waves (specifically layers of materials that are transparent to terahertz radiation) is disclosed in U.S. application Ser. No. 15/434,576 filed on Feb. 16, 2017, which is hereby incorporated in its entirely by reference herein.

The second electromagnetic scanner 50 may be secured to a movable robot 52 (or robot arm). The robot 52 may be configured to maintain a substantially perpendicular orientation between the second scanner 50 and the exterior surfaces of the features of the vehicle body 10 that are being scanned by the second electromagnetic scanner 50. Substantially perpendicular may refer to any value that ranges between 80° and 100°. The robot 52 may be programmed to move the second electromagnetic scanner 50 along a predetermined path to scan all of the exterior surfaces of the vehicle body 10. Alternatively, the robot 52 may be programmed to move the second electromagnetic scanner 50 along a predetermined path to scan predetermined sample surfaces of the of the exterior surface of the vehicle body 10. Although not shown, the inspection station 38 may include multiple robots that each are configured to move one of multiple scanners along a predetermined path to scan a portion of the exterior surfaces of the vehicle body 10. Maintaining a substantially perpendicular orientation between the second scanner 50 and the exterior surfaces of the features of the vehicle body 10 may increase the accuracy of the scan and minimize any errors in the thickness measurements of the individual paint layers deposited on the exterior surface of the vehicle body 10. The associated coordinates of the paint thickness relative to the global coordinate system may more specifically be the global coordinates of the tool center point of the robot 52, which is where the second electromagnetic scanner 50 is secured to the robot. The associated coordinates may then be adjusted for any distance between the tool center point (or the second electromagnetic scanner 50) and the exterior surface of the vehicle body 10. The distance between the tool center point (or the second electromagnetic scanner 50) and the exterior surface of the vehicle body 10 may be measured with a device such as a laser distance measuring device.

The first electromagnetic scanner 48, the second electromagnetic scanner 50, the robot 52, and an interface 54 may each be in communication with a controller 56 through electric and/or wireless connections (not all shown). The first electromagnetic scanner 48 may be configured to communicate the associated coordinates of the features of the vehicle body 10 relative to the global coordinate system to the controller 56. The second electromagnetic scanner 50 and robot 52 combination may be configured to communicate the scanned thicknesses of the paint layers deposited on the exterior surface of vehicle body 10 and the associated coordinates of the paint thicknesses relative to the global coordinate system to the controller 56. Since the conveyance system 40 may be configured to continuously transport the fixture 42 and vehicle body 10 through the inspection station 38 at a substantially constant speed, the associated coordinates of the features of the vehicle body 10 and the associated coordinates of the paint thickness relative to a global coordinate system may be a function of time.

The global coordinate system may be a coordinate system that is relative to the inspection station 38 as a whole. The global coordinate system may include a datum or global origin 58 that acts as reference point for all of the associated global coordinates of the features of the vehicle body 10 and the associated global coordinates of the paint thickness. The global origin 58 is depicted to be defined at base of the robot 52. However, it should be understood that the global origin 58 may be defined at any static position along the inspection station 38. A local coordinate system may be defined by the vehicle body 12. The local coordinate system may be a static coordinate system that maps the locations of the features of the vehicle body 10 (e.g., specific components illustrated in FIG. 1) relative to a datum or local origin 60 that is defined at some point along the vehicle body. The local origin 60 is depicted to be defined along the roof panel 14 of the vehicle body 10. However, it should be understood that the local origin 60 may be defined at any static position along the vehicle body 10.

The controller 56 may be programmed to map corresponding pairs of the global coordinates of the features of the vehicle body 10 detected by the first scanner 48 and the global coordinates of the associated paint thickness detected by the second scanner 50 into a single set of local coordinates defined by the local origin 60. Each single set of the local coordinates will define a location of one of the features of the vehicle body 10 relative to the local origin 60 and one of the paint thicknesses at the location.

Detecting the positions of the vehicle bodies and the associated paint thicknesses relative to the global coordinate system and then transforming the coordinates into local coordinates relative to the vehicle bodies allows for the vehicle bodies to continuously move through the inspection station 38, which increases the number of vehicle bodies that may be sampled for inspection and decreases the cycle time through the inspection station when compared to previous solutions. Previous solutions required stopping the vehicle bodies within the inspection station, which reduced the number of vehicle bodies that could be sampled for paint inspection and reduced the cycle time through the inspection station.

The controller 56 may include an algorithm and/or control logic that converts the global coordinates of the features of the vehicle body 10 and the global coordinates of the associated paint thicknesses into sets of local coordinates. More specifically, the controller 56 may utilize the transformation relationships (1) and (2) discussed immediately below to convert the global coordinates of the features of the vehicle body 10 and the global coordinates of the associated paint thicknesses into sets of local coordinates.

The scanning of the vehicle body 10 in global coordinates, combined with the static body geometry, produces an instantaneous transformation between global coordinates and local coordinates of the vehicle body 10, which may be represented by relationship (1):

$$B_{xyz_{global}}(t) \to f(t) \quad (1)$$

where $B_{xyz_{global}}(t)$ is the instantaneous three-dimensional position of the vehicle body 10 relative to the global coordinate system and $f(t)$ is the instantaneous transformation between the global coordinates and local coordinates of the vehicle body 10.

An instantaneous transformation may be applied to transform the global coordinates of the tool center point of the robot 52 (which corresponds to the global positions of the associated paint thicknesses detected by the second scanner 50) into local coordinates relative to the vehicle body 10. The transformation may be represented by relationship (2):

$$T_{xyz_{global}}(t) \xrightarrow{f(t)} T_{xyz_{body}}(t) \quad (2)$$

where $T_{xyz_{global}}(t)$ is the instantaneous tool center point of the robot 52 in global coordinates and $T_{xyz_{body}}(t)$ is the instantaneous tool center point of the robot 52 in local coordinates While illustrated as one controller, the controller 56 may be part of a larger control system and may be controlled by various other controllers. It should therefore be understood that the controller 56 and one or more other controllers can collectively be referred to as a "controller" that controls various actuators in response to signals from various sensors to control functions the inspection station 38. The controller 56 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 56 in controlling the inspection station 38.

Control logic or functions performed by the controller 56 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based controller, such as controller 56. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the inspection station 38. The computer-readable storage devices or media may include one or more of a number of known physical devices which utilize electric, magnetic, and/or optical storage to keep executable instructions and associated calibration information, operating variables, and the like.

Figure 4:
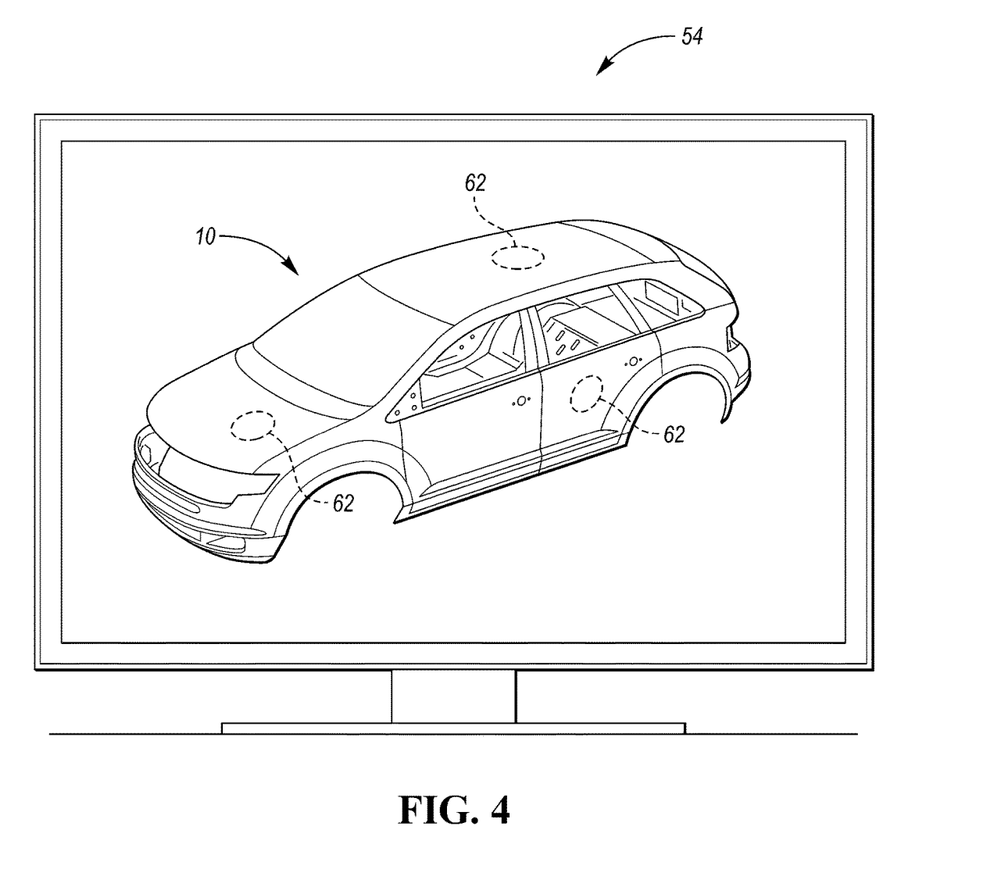
FIG. 4 is an illustration of an interface displaying features of the vehicle body and relative paint thicknesses on the exterior of the vehicle body.

Referring to FIG. 4, the interface 54 is illustrated. The interface 54 is displaying features of the vehicle body 10 and the corresponding paint thicknesses of the features of the vehicle body 10. The interface may display the features of the vehicle body 10 and the corresponding paint thicknesses such that areas of paint thicknesses that are within a tolerable range are differentiated from areas of paint thicknesses that are not within the tolerable range. For example, the interface 54 may highlight areas where the paint thickness is less than or greater than the tolerable range (e.g., the outlined areas 62 depicted in FIG. 4). Alternatively, the interface 54 may display a map of relative thicknesses over the entirety of the vehicle body that resembles a topographical map or a colorimetric heat map, where specific areas of relative "elevation" are highlighted or colored to indicate paint thicknesses that are outside of the tolerable range.

Based on paint thicknesses being outside of the tolerable ranges (whether it be the electro coat layer 30, primer layer 32, basecoat layer 34, and or clearcoat layer 36), the controller 56 may be configured to communicate with the specific paint stations to warn an operator that the paint thickness is out of tolerance, to shut down an automated paint station for repairs, or to adjust the parameters of an automated paint station such that the paint thickness is within the tolerable range. For example, if the clearcoat layer 36 is too thin or too thick at a particular location on the vehicle body 10, the controller may communicate to an automated clearcoat paint station to adjust the speed of any robot applying the clearcoat paint or to adjust the rate at which clearcoat paint is being dispensed from a nozzle.

Figure 5:
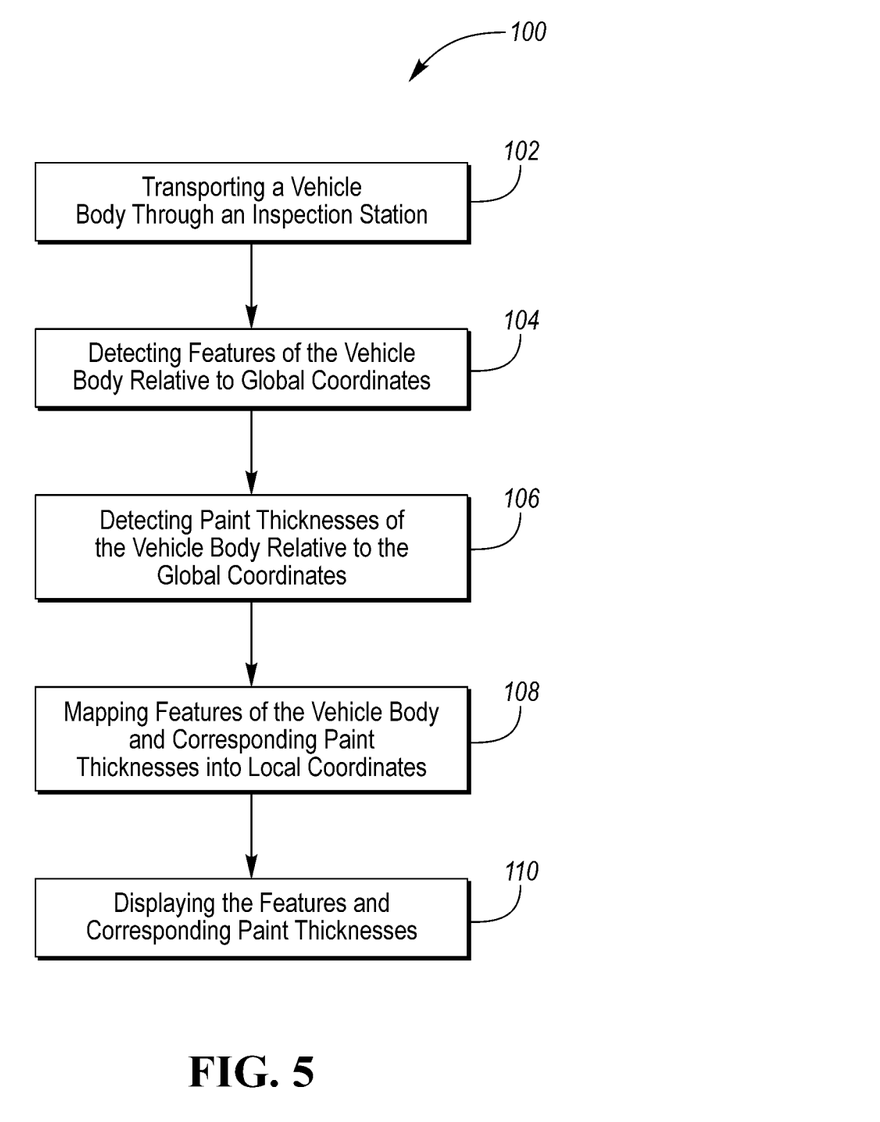
FIG. 5 is a flowchart illustrating a method inspecting vehicle bodies.

Referring to FIG. 5, a flowchart of a method 100 of inspecting vehicle bodies 10 is illustrated. The method 100 begins at block 102 by transporting the vehicle body 10 through the inspection station 38. The vehicle body 10 may be transported through the inspection station 38 at a substantially constant speed. Next, the method 100 moves on to block 104 where features of the vehicle body 10 are detected relative to global coordinates. The features of the vehicle body 10 may be detected relative to the global coordinates by a first electromagnetic scanner, such as the first electromagnetic scanner 48. The method 100 then moves on to block 106 where paint thicknesses of the vehicle body 10 (or paint thicknesses of particular features of the vehicle body 10) are detected relative to the global coordinates by a second electromagnetic scanner, such as the second electromagnetic scanner 50. The second electromagnetic scanner 50 may be configured to maintain a substantially perpendicular orientation with the exterior surfaces of the vehicle body 10 while detecting the paint thicknesses.

Once the features of the vehicle body 10 and the paint thicknesses of the vehicle body 10 are detected relative to the global coordinates, the method 100 moves on to block 108 where the features of the vehicle body 10 and the corresponding paint thicknesses are mapped into a set of local coordinates that have a datum or an origin defined by the vehicle body 10. The local coordinates correspond to locations of the features and the associated paint thicknesses at each location. Once the features of the vehicle body and the corresponding paint thicknesses are mapped into a set of local coordinates, the method moves on to block 110 where the features and the corresponding paint thicknesses are displayed. The features and the corresponding paint thicknesses may be displayed to differentiate between areas of paint thicknesses that are within a tolerable range from areas of paint thicknesses that are not within the tolerable rage. It should be understood that the flowchart in FIG. 5 is for illustrative purposes only and that the method 100 should not be construed as limited to the flowchart in FIG. 5. Some of the steps of the method 100 may be rearranged while others may be omitted entirely.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An inspection station comprising:
   a conveyor configured to continuously transport a vehicle body through the station;
   a first scanner configured to detect features of the vehicle body and associated feature coordinates relative to a global coordinate system;
   a second scanner configured to detect paint thicknesses on surfaces of the vehicle body and associated paint thickness coordinates relative to the global coordinate system;
   a controller programmed to map corresponding pairs of the feature coordinates and paint thickness coordinates into a single set of local coordinates having a datum defined by the vehicle body such that each of the local coordinates defines a location of one of the features relative to the datum and one of the paint thicknesses at the location; and
   an interface configured to display the features and corresponding paint thicknesses.

2. The station of claim 1, wherein the first scanner is a laser scanner.

3. The station of claim 1, wherein the second scanner is a terahertz radiation scanner.

4. The station of claim 1, wherein the interface displays the features and corresponding paint thicknesses such that areas of paint thicknesses that are within a tolerable range are differentiated from areas of paint thicknesses that are not within the tolerable range.

5. The station of claim 1, wherein the conveyor is configured to continuously transport the body through the station at a substantially constant speed.

6. The station of claim 1, wherein the second scanner is secured to a movable robot arm that is configured to maintain a substantially perpendicular orientation between the second scanner and the surfaces of the vehicle body.

7. A method comprising:
   detecting features of a vehicle body relative to global coordinates;
   detecting paint thicknesses of the vehicle body relative to the global coordinates;
   mapping corresponding global coordinates of the features and paint thicknesses into a set of local coordinates having an origin defined by the vehicle body, the local coordinates corresponding to locations of the features and associated paint thicknesses at each location; and
   displaying the features and corresponding paint thicknesses.

8. The method of claim 7, wherein the features are detected via a laser scanner.

9. The method of claim 8, wherein the paint thicknesses are detected via an electromagnetic scanner.

10. The method of claim 9, wherein the electromagnetic scanner is configured to maintain a substantially perpendicular orientation with exterior surfaces of the vehicle body while detecting the paint thicknesses.

11. The method of claim 8, wherein the paint thicknesses are detected via a terahertz radiation scanner.

12. The method of claim 11, wherein the terahertz radiation scanner is configured to maintain a substantially perpendicular orientation with exterior surfaces of the vehicle body while detecting the paint thicknesses.

13. The method of claim 7, wherein displaying the features and corresponding paint thicknesses includes differentiating between areas of paint thicknesses that are within a tolerable range from areas of paint thicknesses that are not within the tolerable range.

14. The method of claim 7 further comprising transporting the vehicle body at a substantially constant speed.

15. A method comprising:
   mapping global coordinates of features of a vehicle body and global coordinates of corresponding paint thicknesses detected while the vehicle body is transported through an inspection station into local coordinates having an origin defined by the vehicle body, the local coordinates corresponding to locations of the features and associated paint thicknesses at each location; and displaying the features and corresponding paint thicknesses.

16. The method of claim 15, wherein the features are detected via a laser scanner.

17. The method of claim 15, wherein the paint thicknesses are detected via a terahertz radiation scanner.

18. The method of claim 17, wherein the terahertz radiation scanner is configured to maintain a substantially perpendicular orientation with exterior surfaces of the vehicle body while detecting the paint thicknesses.

19. The method of claim 15, wherein displaying the features and corresponding paint thicknesses includes differentiating between areas of paint thicknesses that are within a tolerable range from areas of paint thicknesses that are not within the tolerable range.

20. The method of claim 15, wherein the vehicle body is transported through the inspection station at a substantially constant speed.

\* \* \* \* \*